United States Patent [19]
Albert et al.

[11] Patent Number: 5,783,930
[45] Date of Patent: Jul. 21, 1998

[54] SELF-OSCILLATING BUCK MODE BATTERY CHARGER

[75] Inventors: Larry T. Albert, Abingdon; Frank Faez Athari, Baltimore, both of Md.

[73] Assignee: Black & Decker Inc., Newark, Del.

[21] Appl. No.: 782,432

[22] Filed: Jan. 15, 1997

Related U.S. Application Data

[63] Continuation of Ser. No. 602,242, Feb. 16, 1996, abandoned.

[51] Int. Cl.⁶ .................................. H02J 7/04; H02J 7/16
[52] U.S. Cl. ........................ 320/140; 320/158; 320/145
[58] Field of Search ................................ 320/102, 132, 320/134, 136, 141, 140, 145, 148, 158, 159, 163, DIG. 24, DIG. 28, DIG. 30

[56] References Cited

U.S. PATENT DOCUMENTS

| | | |
|---|---|---|
| 3,673,485 | 6/1972 | Vital et al. . |
| 4,211,969 | 7/1980 | Steigerwald . |
| 4,321,523 | 3/1982 | Hammel . |
| 4,350,946 | 9/1982 | Pringze . |
| 4,376,263 | 3/1983 | Pittroff et al. . |
| 4,423,476 | 12/1983 | Neumann . |
| 4,467,264 | 8/1984 | Blake et al. . |
| 4,523,139 | 6/1985 | Schwarz et al. . |
| 4,583,034 | 4/1986 | Martin . |
| 4,710,695 | 12/1987 | Yamada et al. . |
| 4,766,361 | 8/1988 | Pusateri . |
| 4,792,743 | 12/1988 | Tsujino et al. . |
| 4,829,225 | 5/1989 | Podrazhansky et al. . |
| 4,843,299 | 6/1989 | Hutchings . |
| 4,855,663 | 8/1989 | Matsui et al. . |
| 4,999,730 | 3/1991 | Pickard . |
| 5,057,762 | 10/1991 | Goedisen et al. . |
| 5,113,127 | 5/1992 | Hoffman et al. . |
| 5,150,032 | 9/1992 | Ho . |
| 5,266,881 | 11/1993 | Hoffman et al. . |
| 5,270,635 | 12/1993 | Hoffman et al. . |
| 5,349,282 | 9/1994 | McClure . |

FOREIGN PATENT DOCUMENTS

| | | |
|---|---|---|
| 041769 | 12/1981 | European Pat. Off. . |
| 223293 | 5/1987 | European Pat. Off. . |
| 542344 | 5/1993 | European Pat. Off. . |
| 564726 | 10/1993 | European Pat. Off. . |
| 588615 | 3/1994 | European Pat. Off. . |
| 4033119 | 11/1992 | Germany . |
| 3701056 | 5/1994 | Germany . |

*Primary Examiner*—Edward Tso
*Attorney, Agent, or Firm*—Harness, Dickey & Pierce, P.L.C.

[57] ABSTRACT

A self-oscillating buck mode battery charger apparatus 10. The apparatus 10 includes a main switching transistor 22, a first control transistor 34 and a second control transistor 36. The control transistors 34 and 36 are arranged such that neither control transistor sees the full input mains voltage across input terminals 12 of the apparatus 10 when the switching transistor 22 is turned off. An alternative embodiment of the invention includes a high and low main sensing circuit 102 in which a controller 120 is used to detect an excessively high mains voltage condition as well as an undesirably low mains voltage condition. The controller 120 turns off a PWM control circuit 104 when either condition is present for a predetermined length of time. Turning off the PWM control circuit 104 causes the main switching transistor 106 to be turned off, thereby preventing damage to the components of the charger apparatus 100. The charger apparatus is especially well-suited for applications where a rectified DC mains voltage is used to provide a charging current to a rechargeable battery.

9 Claims, 2 Drawing Sheets

SELF-OSCILLATING BUCK MODE BATTERY CHARGER

CROSS REFERENCE TO RELATED APPLICATION

This is a continuation of U.S. application Ser. No. 08/602,242 filed Feb. 16, 1996, presently abandoned.

FIELD OF THE INVENTION

This invention relates to battery charging apparatus, and more particularly to a self-oscillating buck mode battery charger apparatus which does not require high power handling control transistors for controlling the application of a charging current to a rechargeable battery or batteries.

DISCUSSION

Buck mode battery charging apparatuses typically employ a main switching element to apply DC voltage pulses into an output smoothing filter consisting of an inductor and a capacitor. The output voltage is the pulse-width-modulated (PWM) average of the input voltage and will vary with the duty cycle of the main switch. During the on-time of the main switch, the current in the inductor ramps to some peak value. When the switch turns off, the current begins to ramp downward and the voltage across the inductor reverses. This drives the cathode of a commutating diode coupled across one side of the inductor and one side of the rechargeable battery's negative terminal into conduction. The inductor then discharges, driven by the voltage of the battery.

In the self-oscillating buck mode converter, when the main switching transistor turns on, the current in the inductor ramps up until a certain peak current causes a peak current limiting circuit to turn off the switch. The current then ramps down as the voltage across the inductor reverses and clamps across a commutating diode. As soon as the inductor is fully discharged and the commutating diode is again reversed biased, the process starts over due to additional control circuitry that turns the main switching transistor back on. As soon as one cycle is finished (i.e., as soon as the inductor current goes to zero), a new cycle is automatically started.

One patent which discloses the basic topology of a self-oscillating buck mode converter used to charge one battery bank from a higher voltage battery bank is U.S. Pat. No. 3,771,039 to Stewart, issued Nov. 6, 1973. While it would appear that substituting an AC source, a rectifier circuit and a filter capacitor for the higher voltage batteries used in Stewart would seem to allow the converter disclosed in Stewart to operate from a high voltage AC mains power source, such changes would introduce significant practical problems with this converter design. The charger disclosed in the Stewart patent employs a control transistor which supplies a drive current directly to the switching transistor. This control transistor must withstand the higher battery's voltage along with any overshoot that may be present, as well as be able to supply the required amount of drive current to the base (or gate) of the switching transistor. For lower input voltage systems for which the Stewart patent addresses (i.e., telco central office batteries charging subscriber batteries, typically 48 volts DC nominal), this represents fairly low switching losses as well as a fairly typically rated control transistor. As the DC input voltage increases, however, the switching losses increase to the point where the losses are excessive. In addition, a control transistor must be chosen that can withstand the fairly high collector-to-emitter voltages (400 volts DC minimum for the 230 volt AC situation). In addition, if the Stewart method were to be applied to a higher voltage converter, such as one being used with a 230 volt AC mains voltage having suitable rectification circuitry, turning off the converter becomes significantly more difficult. In the Stewart converter, if transistor Q1 operation was interrupted, then transistor Q3 would be absent base drive, but without a means to quickly turn off as Q2 would not turn on. This could result in excessive losses in transistor Q3.

Another problem with battery chargers that use a switch-mode type converter to supply charging current to one or more batteries is the potential damage to the main switching transistor which can result if the transistor must conduct excessive current (due to low input voltage) or if the main switching transistor turns off into an excessively high input voltage. Both conditions could exist in situations of wildly fluctuating mains or in cases where there is a large amount of harmonic distortion on the mains. Both situations can exist where battery charges are operated from generators or static converters in the field.

SUMMARY OF THE INVENTION

It is therefore a principal object of the present invention to provide a battery charger of the self-oscillating buck mode type which is suitable for use with the higher DC voltages present when the converter is operated from a relatively high voltage AC source, such as 230 volt AC source. More specifically, it is a principal object to provide an arrangement of control transistors in which no one of the control transistors sees the full rectified DC input voltage from the mains power source when the main switching transistor of the converter is turned off. It is another object of the present invention to provide a relatively simple and low cost circuit for monitoring the rectified mains voltage and to sense for the conditions of an excessively high mains voltage and an unacceptably low mains voltage for predetermined lengths of time. More specifically, it is an object to provide a circuit which not only senses for conditions of an excessively high mains voltage or an unacceptably low mains voltage, but which also causes the control transistors to turn off the main switching transistor in the event either condition occurs for a predetermined period of time.

The above and other objects are provided by a self-oscillating buck mode type battery charger apparatus in accordance with the preferred embodiments of the present invention disclosed herein. The charger apparatus of the present invention employs a control transistor network in which first and second control transistors are employed to turn on and off a main switching transistor. The control transistor network further includes a third switching element for turning on and off the second control transistor, which in turn helps to control on and off operation of the first control transistor. The first and second control transistors are further intercoupled such that the collector of neither transistor is coupled directly to, or through a resistor to, one of the input terminals of the charger apparatus. Thus, neither the first or second control transistors experience a collector voltage which is near the rectified mains voltage when the main switching transistor is turned off.

In an alternative preferred embodiment of the invention a mains voltage sensing circuit is included for sensing unacceptably high or low mains voltage conditions which could damage or otherwise seriously stress the charger apparatus. In this regard, the apparatus of the present invention includes a controller and a voltage divider circuit coupled across the main filter capacitor via a zener diode. A reference voltage is input to one input of the controller and a peak voltage signal is input to another input of the controller. A comparator within the controller monitors the peak input voltage signal relative to the reference voltage input signal and causes the control transistor network to turn off the main switching transistor when the peak voltage input signal rises above a predetermined maximum value for a predetermined length of time. The controller also receives a low voltage input signal which is generated when the voltage across the main filtering capacitor drops below a predetermined minimum value for a predetermined time. When this condition occurs, the controller also causes the control transistor network to turn off the main switching transistor. The controller also controls the divider network such that the network can be used to supply a lower peak input voltage, which is used as a threshold to determine when the input voltage has returned to a minimum acceptable level. In this manner, the main switching transistor is protected against situations where an unacceptably high mains voltage occurs, which could damage or stress the main switching transistor when the transistor is turned off, and also against situations where an unacceptably low mains voltage occurs, which could also damage or stress the main switching transistor if same attempts to conduct excessive current due to the unacceptably low mains voltage.

The mains sensing circuitry of the present invention is not limited to self-oscillating buck mode type battery chargers but rather may be used with any type of switch-mode type converter which incorporates a main switching transistor for controlling a charging current. The mains sensing circuit is further comprised of a relatively small number of components and therefore it does not add appreciably to the overall cost or complexity of the charger apparatus into which it is incorporated.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
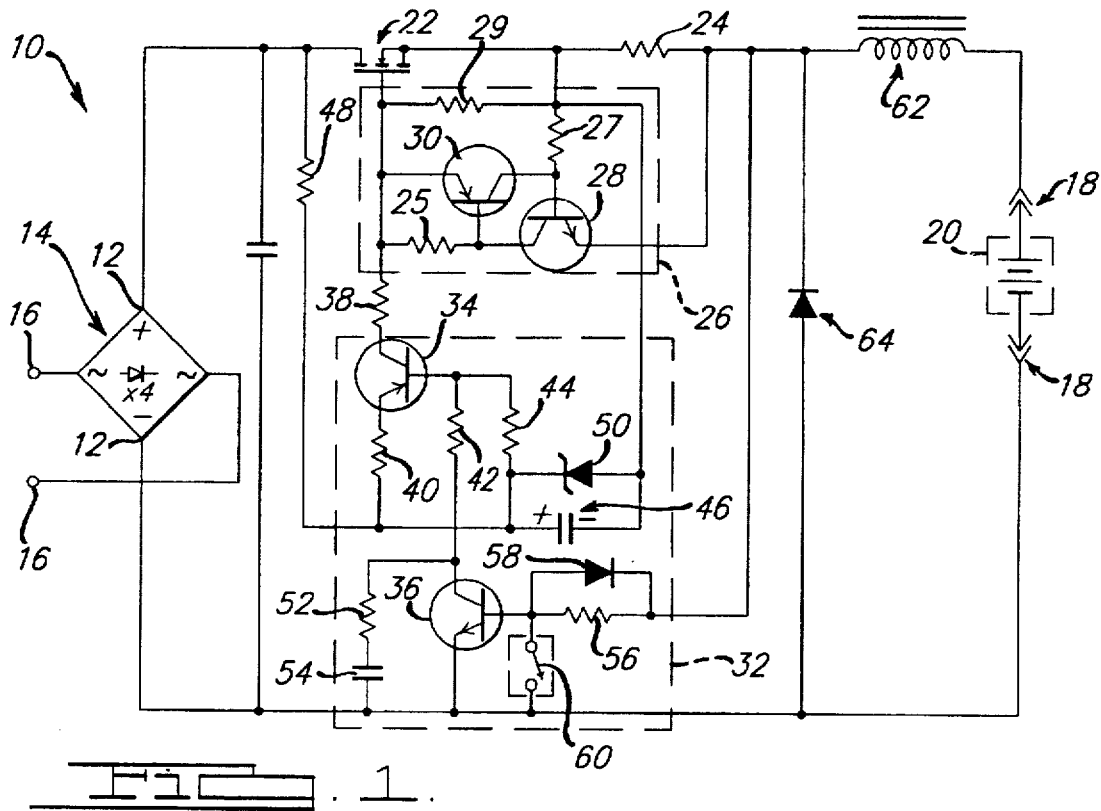
FIG. 1 is a circuit diagram of a self-oscillating buck mode type battery charger apparatus in accordance with a preferred embodiment of the present invention.

Referring to FIG. 1, there is shown a self-oscillating buck mode style battery charger 10 in accordance with a preferred embodiment of the present invention. The apparatus 10 generally comprises a pair of input terminals 12 which are coupled to a bridge rectifier circuit 14. Input terminals 16 of the rectifier circuit 14 are coupled to an AC voltage source, for example, a 230 volt AC source. The apparatus 10 includes output terminals 18 which are electrically coupled to a rechargeable battery pack 20. It will be appreciated that the rechargeable battery pack 20 is positioned within a suitable charging bay such that the battery pack 20 can be easily and quickly inserted and removed. It will also be appreciated that suitable circuitry (not shown) will typically be used to prevent current flow to the output terminals 18 when a battery pack is not inserted. When inserted, the battery pack 20 is electrically coupled to the output terminals 18. The apparatus 10 is principally intended to be used to charge nickel cadmium battery packs. It will be appreciated, however, that the principles of the present invention can be applied to other forms of chargers to charge other types of rechargeable battery packs.

With further reference to FIG. 1, the apparatus 10 includes a first or main switching transistor in the form of a field effect transistor (FET) 22. A current sensing resistor 24 is disposed so as to sense the current flow through the main switching transistor 22 when same is conducting and to supply a signal to a latching circuit 26 comprised of bipolar junction transistors 28 and 30 and resistors 25, 27 and 29. A control network 32 is used to help control the on/off operation of the main switching transistor 22. The control network 32 comprises a first control transistor 34 in the form of a PNP bipolar junction transistor and a second control transistor 36 in the form of an NPN bipolar junction transistor. Resistors 38 and 40 are coupled to the collector and emitter, respectively, of first control transistor 34 while resistors 42 and 44 are coupled to the base of transistor 34. A first capacitor 46 is coupled to input terminal 12 through a resistor 48. A zener diode 50 having a maximum break over voltage of 18 volts is coupled across the capacitor 46.

With further reference to FIG. 1, the control network 32 includes a resistor 52 having one end coupled to the collector of the second control transistor 36, with the other end of resistor 52 coupled to a second capacitor 54. The opposite side of capacitor 54 is coupled to the emitter of the second control transistor 36. A resistor 56 is coupled to the base of the transistor 36 and a diode 58 is coupled across resistor 56 to clamp the voltage across resistor 56 to about 0.6 volts. To control the on/off operation of the second control transistor 36, the base thereof is coupled to either another transistor or an output from a controller (not shown), which has been designated for simplicity as a switch 60. The switch 60 functions essentially to divert current from the base of the second control transistor 36 to turn off the second control transistor 36. The controller could be a microcomputer, which will typically be incorporated with the battery charger apparatus 10 to monitor the voltage of the battery pack 20, and therefore would usually include the capability (in the form of an open collector port) to turn off the second control transistor 36 when the battery pack 20 is fully charged.

With further reference to FIG. 1, the apparatus 10 conventionally includes an inductor 62 and a commutating diode 64 for allowing the inductor 62 to discharge when the main switching transistor 22 is turned off. It will be appreciated that the inductor 62 and the commutating diode 64 are components which are standard to all buck-mode style battery chargers.

Turning now to the operation of the apparatus 10 shown in FIG. 1, capacitor 54 is initially charged to the voltage of the battery pack 20 plus the voltage across the zener diode 50. When the switch 60 is opened (turning on the apparatus 10), the second control transistor 36 is forward biased, which turns on the first control transistor 34. When the second control transistor 36 first turns on, the charge stored by the second capacitor 54 begins to discharge through the second control transistor 36. The charge on the first capacitor 46 begins to discharge through resistors 40, 38 and 29, and the first control transistor 34, when transistor 34 is first turned on to provide a gate drive signal to the gate of the main switching transistor 22. This causes the main switching transistor 22 to turn on, which provides a charging current through current sensing resistor 24, through the inductor 62 and to the rechargeable battery pack 20. At this time, transistors 28 and 30 of the latching circuit 26 are turned off.

As the current through current sensing transistor 24 rises, a point is reached when the voltage drop across resistor 24 is sufficient to forward bias transistor 28 of the latching circuit 26. When transistor 28 turns on, the base of transistor 30 goes low, which turns on transistor 30, which diverts the gate drive signal from the gate of the main switching transistor 22 to turn off transistor 22. When the main switching transistor 22 turns off, current flow to the inductor 62 is interrupted and the polarity of the voltage across the inductor 62 reverses. The inductor 62 then begins to discharge through the commutating diode 64. The inductor 62 continues to discharge through the commutating diode 64 until the inductor 62 is fully discharged. At this point, the voltage on the cathode side of the commutating diode 64 begins to rise due to the presence of the battery pack 20, which reverse biases diode 64. The voltage across diode 64 will then rise to the level of the battery pack 20.

During the time that the main switching transistor 22 is turned off, the first capacitor 46 charges through resistor 48 up to about 18 volts. During this time, the first control transistor 34 and second control transistor 36 are turned off, which allows the second capacitor 54 to charge through resistors 48, 44, 42 and 52 to a level somewhat less than that of capacitor 146. Accordingly, during on and off operation of the apparatus 10, capacitor 54 alternately charges and discharges to attain an intermediate voltage less than that across the first capacitor 46.

The configuration of the control transistors 34 and 36 are such that neither transistor "sees" the full rectified mains voltage across the input terminals 12. This is due to the sequence in which the control transistors 34 and 36 and the main switching transistor 22 turn off. The main switching transistor 22 will not turn off until the second control transistor 36 turns off. When the second control transistor 36 is initially turned off by operation of the switch 60, the first control transistor 34 does not turn off immediately. Instead, base current through the first control transistor 34 is maintained, however, as base current then begins to flow through resistor 42 and resistor 52, which begins recharging capacitor 54. This allows the first control transistor 34 to remain turned on for a short period of time after the second control transistor 36 turns off, which also allows the current flow through the current sensing resistor 24 to continue until the voltage drop across resistor 24 reaches a value sufficient to forward bias transistor 28. This prevent the possible situation where if the first control transistor 34 was turned off quickly, the main switching transistor 22 would be deprived of gate drive but have no means of turning off quickly except by discharging gate drive current through resistor 29. By maintaining the first control transistor 34 turned on for a short time period, the current flow through the current sensing resistor is allowed to increase to the point where the latching circuit 26 can turn off the main switching transistor 22.

It is a principal advantage of the present invention that when the apparatus 10 is turned off by closing the switch 60 neither the first or second control transistors 34 and 36, respectively, see the full rectified mains voltage across the input terminals 12. This is because of the fact that the first control transistor 34 is allowed to remain turned on for a short period of time after the second control transistor 36 is turned off. Thus, when the second control transistor 36 is turned off, its collector to emitter voltage is always something less than the voltage across capacitor 46, which also is clamped at 18 volts maximum by zener diode 50.

When the apparatus 10 is to be turned on again, the switch 60 is opened which causes the second control transistor 36 to be forward biased. This in turn turns on the first control transistor 34 which allows the capacitor 46 to provide a gate drive signal to the gate of main switching transistor 22. This allows current to flow through current sensing resistor 24 and to begin to charge the inductor 62 and the rechargeable battery pack 20. When the inductor 62 is fully discharged, the voltage at the collector of the second control transistor 36 will rise to a maximum voltage of less than the voltage of the battery pack 20 plus the voltage across the capacitor 46. The peak voltage measured across the collector and emitter of the second control transistor 36 is therefore set by the peak voltage at the cathode of diode 64 and the voltage across the zener diode 50, divided by the ratio of resistors 42 and 52. Accordingly, neither control transistor 34 or transistor 36 "sees" the full rectified mains voltage across the input terminals 12.

The apparatus 10 allows the use of control transistors having significantly lower voltage ratings, which often have superior switching speeds and are less expensive than transistors which would be needed to handle the full rectified mains voltage. By incorporating transistors having higher switching speeds, the switching losses across control transistors 34 and 36 are reduced significantly resulting in a more efficient charging apparatus.

Figure 2:
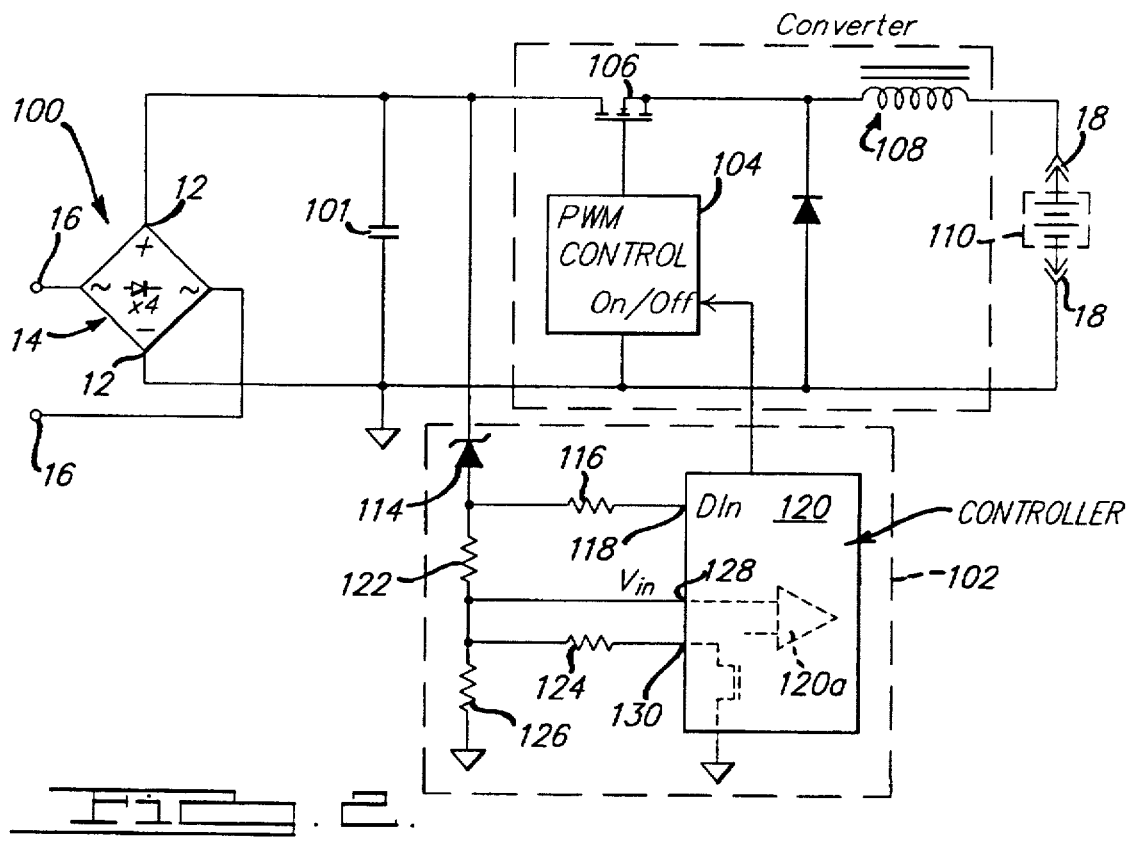
FIG. 2 is a circuit drawing of a simplified switch-mode type converter incorporating the high and low mains voltage sensing circuitry of the present invention.

Referring to FIG. 2, there is shown a conventional switch-mode battery charger apparatus 100 incorporating a high and low mains voltage sensing circuit 102 in accordance with an alternative preferred embodiment of the present invention. It will be appreciated immediately that the mains voltage sensing circuit 102 can be used effectively with any type of switch-mode battery charger to sense an excessively high or undesirably low mains voltage condition. For simplicity, the switch-mode type battery charger 100 has been shown in simplified form.

In buck mode type converters, there are two types of stress to the main switching transistor that are related to the input mains voltage. Both of these stresses can lead to the ultimate failure of the part. One stress is related to the peak voltage applied to the main switching transistor when the transistor is off. The circuit 102 described hereafter monitors the peak voltage and turns off the apparatus 100 when the voltage is too high by sensing the rectified and filtered mains supply voltage and turning off the apparatus 100 when this voltage is above a fixed threshold.

The other possible overstress can occur when the current through the main switching transistor is too high. The current through the main switching transistor for each cycle is inversely proportional to the instantaneous value of the rectified and filtered input voltage during that cycle. Variations during an AC line cycle of this voltage is termed ripple. The lowest point of the ripple represents the moment of greatest current stress. Excessively low ripple valleys can cause failure of the switching transistor due to excessive current. Due to a number of reasons such as input mains voltage, line frequency, loading or harmonic distortion of the mains supply, there can be varying degrees of ripple amplitude on the rectified and filtered mains supply. The apparatus 100 incorporates circuit 102, which is designed to monitor the ripple voltage and turns off the converter if the ripple valley voltage is below a certain threshold value for some aggregate length of time.

When the apparatus 100 turns off, there is no longer any ripple present and this means that there must be some other criterion established to re-enable the apparatus 100. In order to do this, the same circuit described above for peak voltage sensing is reconfigured and used to sense a minimum peak voltage required to turn the apparatus 100 back on. This reconfiguration is accomplished by changing the scaling of the signal being sensed.

With continued reference to FIG. 2, the charger apparatus 100 includes an input capacitor 101, a conventional switching transistor 106, inductor 108 and a commutating diode 110. A conventional PWM control circuit 104 is used to turn on and off the main switching transistor 106 as needed. When the transistor 106 is turned on, current is flowing through the inductor 108 charging the inductor 108 and charging a battery pack 110. When the PWM control circuit 104 turns off the main switching transistor 106, the polarity of the voltage across the inductor 108 switches and the inductor begins to discharge through the commutating diode 110. When the PWM control circuit 104 again turns on the main switching transistor 106, the inductor 108 again begins to charge and the cycle is repeated.

The high and low mains sensing circuit 102 shown in FIG. 2 comprises a zener diode 114, a resistor 116 coupled to input 118 of a controller 120, a resistor 122 and resistors 124 and 126. One side of resistor 122 is coupled to a reference voltage input 128 of the controller 120 while one side of the resistor 124 is coupled to a peak voltage input 130 of the controller 120. Resistors 122 and 126 form a well known voltage divider circuit. Resistors 116 and 124 function as scaling resistors to scale the signals to the inputs 118 and 130. The input ports 128 and 130 of the controller 120 are the inputs of an internal comparator 128, which is shown in dashed lines.

With further reference to FIG. 2, when the charger apparatus 100 is charging the battery pack 110, there is a DC voltage on the input capacitor 101 that has a ripple component. The peak of the voltage across the capacitor 101 is equal to the peak rectified mains voltage seen across input terminals 12 of the apparatus 100. Input port 130 of the controller 120 is an open drain port which, when turned on, places resistors 124 and 126 in parallel. The peak input voltage seen at input port 128 may thus be represented by the following equation:

$$V_{in}(peak) = [(V_{peak} - V_{diode\ 114})(R_{124/126})]/[R_{122} + R_{124/126}]$$

where $R_{124/126}$ is the parallel resistance of resistors 124 and 126.

When the peak input voltage ($V_{in}$ peak) at controller input 130 rises above the reference voltage for a predetermined length of time, the controller 120 causes the PWM control 104 to be turned off. This turns off the main switching transistor 106 to interrupt charging of the battery pack 110. In this manner the various components of the charger apparatus 100 will not be damaged by an excessively high mains peak input voltage. The timing could be accomplished by an internal timer of the controller 120 (not shown) or an external timer (not shown) which is started upon sensing of an over-voltage condition by the comparator 128. In this manner the PWM control 104 can be maintained turned off when the internal or external timer reaches a predetermined count.

The mains sensing circuit 102 also functions to detect an undesirably low mains input voltage which could damage the main switching transistor 106. When the mains input voltage drops below a predetermined level, the valley of the ripple voltage across the input capacitor 101 drops. If the valley of the ripple input voltage is low enough, the zener diode 114 falls out of conduction and the input 118 of the micro controller 120 goes from a logic "1" to a logic "0" level. The time that the input 118 is at a logic low level is monitored by the use of a timer and, if a predetermined time value is reached, the PWM control 104 is turned off.

The resuming of charging after sensing a low mains voltage condition cannot be done on the basis of the ripple valley, since there is no more voltage ripple after the apparatus 10 is turned off. Turning the apparatus 10 back on is instead accomplished by the controller causing port 130 to go low, thereby removing resistor 124 from its parallel connection to resistor 126. This changes the ratio of the divider circuit to configure the circuit 102 to check for a lower peak voltage value. Specifically, the $V_{in}$ signal at port 128 will decrease, thus causing the internal comparator 120a to check for the presence of a low peak voltage condition.

The mains sensing circuit 102 thus provides a simple, yet effective means for monitoring the mains input voltage and turning off the charger apparatus 100 in the event of an unacceptably high or undesirably low mains voltage condition occurring for a predetermined length of time. The sensing circuit 102 is further resistant to transient changes in the mains voltage which would not seriously stress the components of the converter apparatus 100. Charging operation is only interrupted if the unacceptable voltage condition persists for a predetermined minimum length of time.

Figure 3:
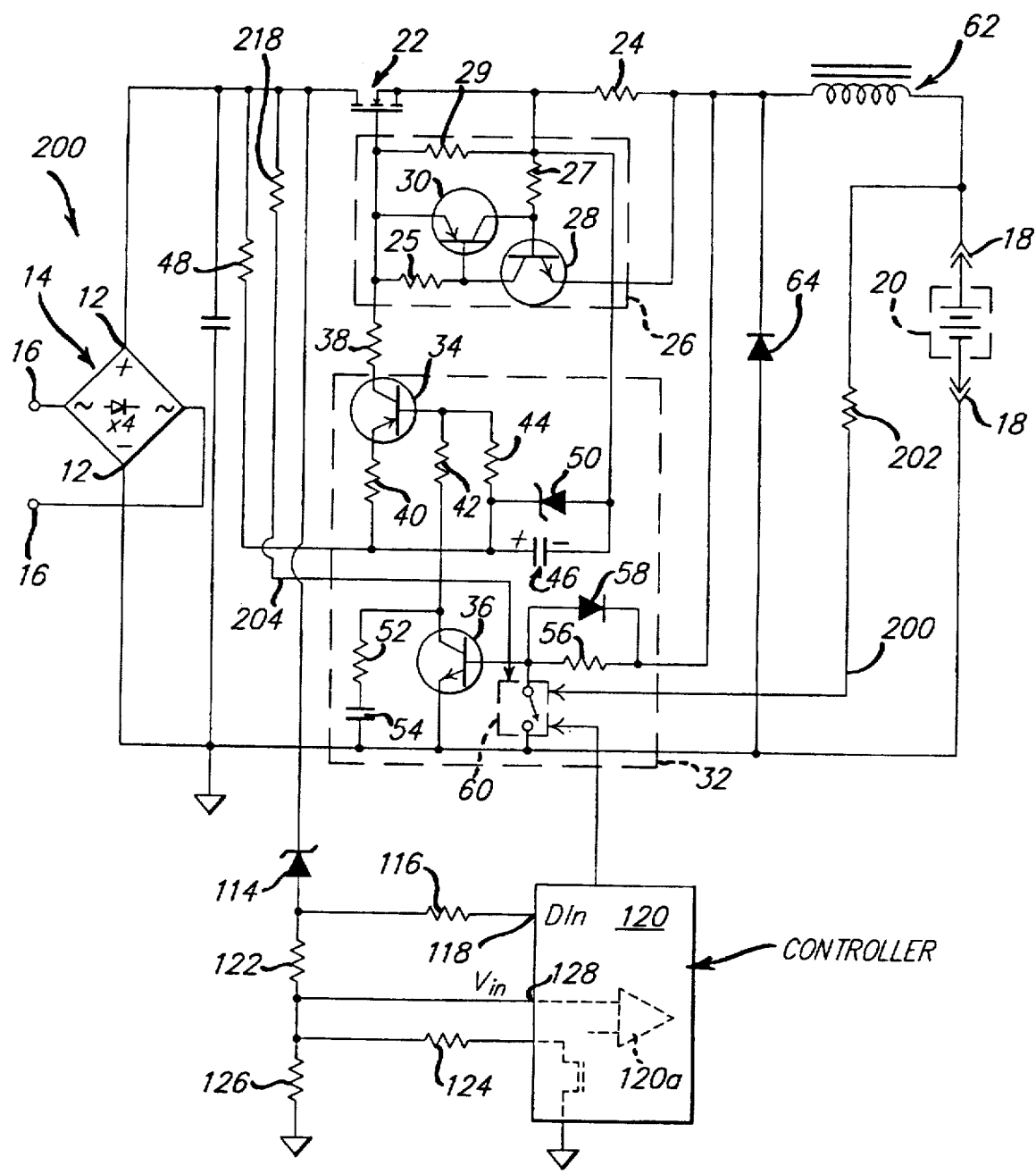
FIG. 3 is a circuit diagram of the circuit shown in FIG. 1 incorporating the mains voltage sensing circuitry shown in FIG. 2.

Referring now to FIG. 3, the circuit of FIG. 1 is shown together with the high and low mains voltage sensing circuit described in connection with FIG. 2. The circuit 200 shown in FIG. 3 is identical to the circuit shown in FIG. 1 and therefore like components have like reference numerals. The high and low mains sensing circuit is identical to that disclosed in FIG. 2 and therefore like components in FIGS. 2 and 3 (relative to the high and low mains sensing circuit) have been denoted by the same reference numerals in FIG. 3. FIG. 3 is intended to show how the mains sensing circuit 102 may be coupled to the circuit of FIG. 1. The circuit of FIG. 3 also includes additional connections to the switch 60 to enhance the control over the switch 60. In this regard, the switch 60 is normally closed such that the battery charger apparatus 10 will not begin operation immediately upon being coupled to the AC mains power source and a rechargeable battery pack 20 being inserted into its associated charging bay. This is accomplished by a signal provided by circuit line 204 and resistor 208 which tends to hold the switch 60 in is normally closed position such that the second control transistor 36 is turned off. As recalled from the discussion of FIG. 1, the main switching transistor 22 cannot turn on until the second control transistor 36 is turned on. As a further safeguard, the switch 60 is also coupled across the output terminals 18 to receive the full rectified mains DC voltage via circuit line 200 and resistor 202. Accordingly, whether or not a rechargeable battery pack 20 is inserted in its associated charging bay, the switch 60 will be held in its normally closed position, thereby keeping the second control transistor 36 turned off until an appropriate signal from the controller 120 causes the switch 60 to open. In this manner, it is assured that the switch 60 will only cause the second control transistor 36 to turn on and initiate the charging sequence in response to a signal from the controller 120.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

We claim:

1. A self-oscillating buck mode battery charger apparatus incorporating an inductor for charging a rechargeable battery, said apparatus comprising:

an input for receiving a rectified DC input voltage;

a switching element in communication with the input for controlling the application of a charging current to an output of said apparatus, wherein said output is adapted to be electrically coupled to at least one battery;

a first capacitor for applying a drive signal to said switching element;

a first control transistor responsive to said battery voltage for controlling conduction of said switching element;

a second control transistor for turning on and off said first control transistor in response to the discharge of said inductor;

a current sensing element for sensing current flow through said switching element;

a latching circuit responsive to said current sensing element for turning off said switching element when said current flow through said switching element reaches a predetermined maximum value; and wherein said first and second control transistors are configured such that neither experiences said rectified DC input voltage when one said switching element is turned off by said latching circuit.

2. The apparatus of claim 1, further comprising a circuit responsive to the rectified DC input voltage for causing said first and second control transistors to turn off said switching element when said rectified DC input voltage rises above a predetermined maximum value for a predetermined length of time and when said rectified DC input voltage drops below a predetermined minimum value for a predetermined time.

3. The apparatus of claim 2, wherein said circuit includes:

a controller having first and second inputs;

a voltage divider circuit coupled across the input for receiving a rectified DC input voltage to provide a reference voltage signal to the first input of the controller and a peak voltage signal to the second input of the controller, wherein the controller includes an internal comparator; and wherein the controller causes a signal to be generated for turning off the first and second control transistors, to thereby turn off the switching element, when the peak voltage input signal rises above a predetermined maximum value for a predetermined length of time.

4. The apparatus of claim 3, wherein the voltage divider circuit further includes a zener diode coupled in series between the input for receiving a rectified DC input voltage and the voltage divider circuit;

the zener diode operating to fall out of conduction when the rectified DC input voltage falls below the lower predetermined level, the controller having a third input responsive to conduction and non-conduction of the zener diode for detecting when the zener diode falls out of conduction, and the controller generating a signal for turning off the first and second control transistors when the zener diode has stopped conducting for a predetermined length of time indicative of an unacceptably low rectified DC input voltage.

5. A self-oscillating buck mode battery charger apparatus incorporating an inductor for charging a rechargeable battery, the apparatus comprising:

an input terminal for receiving a rectified DC input voltage;

a main switching transistor in communication with the input for controlling the application of a charging current to an output of the apparatus, the output being adapted to be electrically coupled to at least one battery to charge the one battery;

a first capacitor for applying a drive signal to the main switching transistor;

a first controller transistor responsive to the battery voltage of said one battery for controlling conduction of the main switching transistor;

a second controller transistor for turning on and off the first controlled transistor in response to the discharge of said inductor;

a circuit for sensing current flow through the main switching transistor and for turning off the main switching transistor when the current flow therethrough reaches a predetermined maximum value; and wherein the first and second control transistors are configured such that neither experiences said rectified DC input voltage when the main switching transistor is turned off.

6. The apparatus of claim 5, further comprising a circuit for sensing said rectified DC input voltage and causing the main switching transistor to be turned off if the rectified DC input voltage exceeds an upper predetermined value for a predetermined length of time, and for causing the main switching transistor to be turned off if the rectified DC input voltage drops below a minimum lower value for a predetermined length of time.

7. The apparatus of claim 6, wherein the circuit for monitoring the rectified DC input voltage and for turning off the main switching transistor comprises a voltage divider circuit coupled to the input terminal;

a controller having a plurality of inputs responsive to the voltage signals generated from the voltage divider circuit; and a zener diode coupled in series between the voltage divider circuit and the input terminal;

the controller operating to generate a signal for causing said first and second control transistors to turn off when the rectified DC input voltage exceeds a said predetermined upper limit for a predetermined length of time and when said rectified DC voltage falls below said predetermined lower limit for a predetermined length of time.

8. The apparatus of claim 7, wherein the rectified DC input voltage falling below said predetermined lower limit is detected by the controller monitoring induction of the zener diode in determining that the rectified DC input voltage has dropped below the predetermined lower limit when the zener diode falls out of conduction.

9. A self-oscillating buck mode battery charger apparatus incorporating an inductor for charging a rechargeable battery, said apparatus comprising:

an input terminal for receiving a rectified DC input voltage;

a main switching transistor in communication with the input terminal for controlling the application of a charging current supplied to the input terminal to an output of the apparatus, wherein the output is adapted to be electrically coupled to at least one rechargeable battery;

a first capacitor for applying a drive signal to the main switching transistor;

a first control transistor responsive to a battery voltage of said one rechargeable battery for controlling conduction of the main switching transistor;

a second control transistor for turning on and off the first control transistor in response to the discharge of said inductor;

a current sensing element for sensing current flow through the main switching transistor;

a circuit responsive to the current sensing element for turning off the main switching transistor when the current flow therethrough reaches a predetermined maximum value; and wherein the first and second control transistors are configured such that neither experiences the rectified DC input voltage when said main switching transistor is turned off.

* * * * *